April 7, 1925.                      1,532,426
C. W. METZ
FORD MOTOR ATTACHMENT
Filed Sept. 7, 1922
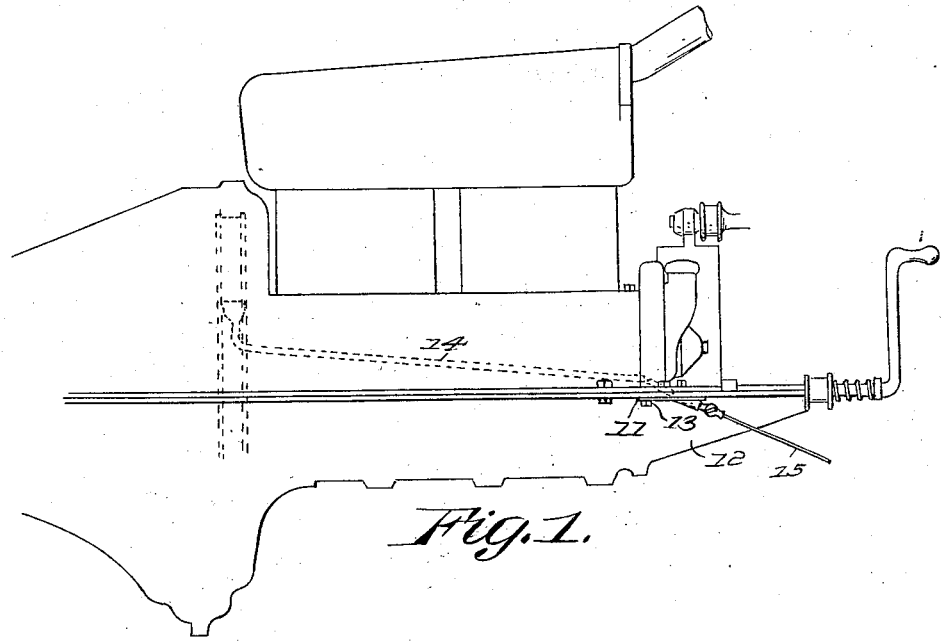
Fig. 1.
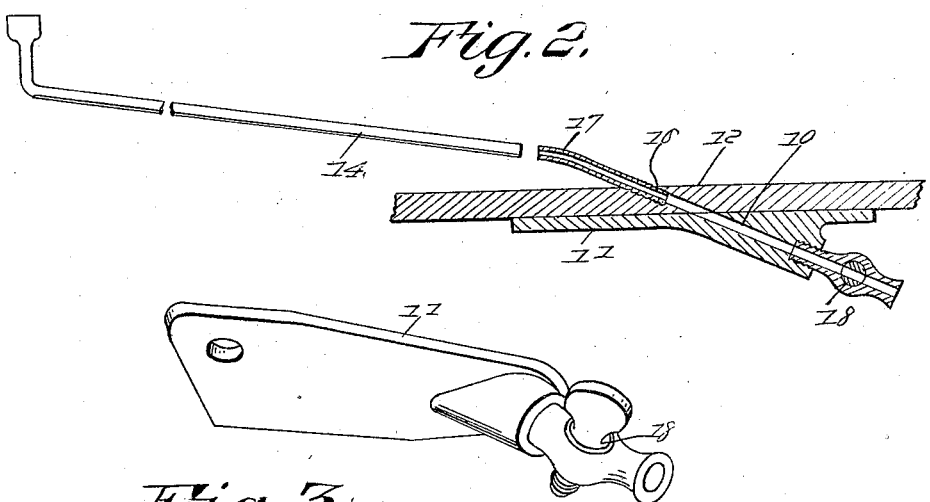
Fig. 2.
Fig. 3.
Inventor
C. W. Metz,
By
Attorney Patented Apr. 7, 1925.

1,532,426

UNITED STATES PATENT OFFICE.

CHARLES W. METZ, OF SIDNEY, NEBRASKA.

FORD MOTOR ATTACHMENT.

Application filed September 7, 1922. Serial No. 536,636.

*To all whom it may concern:*

Be it known that CHARLES W. METZ, a citizen of the United States of America, residing at Sidney, in the county of Cheyenne and State of Nebraska, has invented new and useful Improvements in Ford Motor Attachments, of which the following is a specification.

The object of the invention is to provide a simple and efficient attachment for use in connection with motors of the Ford and similar types and designed to be sold and applied as an accessory, whereby the cleansing of the oil line between the dash cup at the transmission end of the crank case and the timing gears at the front end thereof may readily be cleansed and relieved of any obstructions due to sediment or impurities in the oil lodging in the oil line and interfering with the free flow of lubricant to the said gears or to the front end of the crank case for distribution as in the ordinary practice; and with this object in view the invention consists in a construction and combination of parts of which a preferred embodiment is shown in the accompanying drawings, wherein:—

Figure 1 is a side view, and

Figure 2 is a horizontal sectional view of a Ford motor casing having attached thereto a cleansing device constructed in accordance with the invention.

Figure 3 is a detail view of the attachment.

The device consists essentially of a valve controlled guide opening 10 formed in a base plate 11 or its equivalent attachable to the wall of a crank case 12 by bolts or tap screws 13 in alignment with the tube 14 representing the oil line or means of conveying oil from the rear end of the motor casing to the front end thereof as ordinarily employed in machines of the Ford type, so that a cleansing wire or flexible cable, indicated at 15, may be inserted through the guide opening and a registering opening 16 formed in the wall of the crank casing (when the device is applied as herein shown as an attachment to a crank casing of the ordinary construction) for insertion into and movement longitudinally of the tube forming the oil line so as to remove any obstructions therefrom and force such obstructions out of the rear end of the tube.

In the illustrated embodiment of the invention where the intention is to provide an attachment applicable to Ford motor crank cases now in use, the base plate is secured to the exterior surface of the crank casing and in registration with the guide opening formed in the base plate is a similar opening 16 as above indicated provided in registration therewith in the wall of the crank case, and in addition thereto the guide opening is supplemented by a guide tube 17 disposed in oblique relation to the plane of the base plate and the side wall of the crank casing, so as to be in substantial alignment with the oil tube which is to be cleansed.

Moreover in the construction illustrated said guide opening is formed to receive a pet cock having the valve member 18 which is normally kept closed but which may be opened to permit of the insertion of the cleaning wire or cable for introduction into and movement longitudinally of the tube forming the oil line.

Where the device is applied as an attachment to a Ford motor crank casing now in use the base plate may be secured thereto and therefore the valve of the pet cock may be opened and a drill may be inserted through the guide for forming an opening in the wall of the crank casing in registration with that in the base plate.

Having described the invention, what is claimed as new and useful is:—

1. A crank case for motors of the type having a tubular oil line for conveying lubricant to the front end thereof, said crank case having a valve controlled guide opening in substantial alignment with the oil line for the reception of a cleansing and obstruction-removing element for insertion into the oil line.

2. A crank case for motors of the type having a tubular oil line for conveying lubricant to the front end thereof, said case having a valve controlled guide opening for the reception of a cleansing and obstruction-removing element for insertion into the oil line, said guide opening being in substantial alignment with the oil line, and a guide tube supplementing said guide opening.

3. The combination with a crank case for motors having a tubular oil line, of an attachment for the crank case comprising a base plate provided with an opening in substantial alignment with the oil line and with a similar opening in said wall, and means for closing the guide opening when not in use.

4. The combination with a crank case for motors having a tubular oil line, of an attachment comprising a base plate having a guide opening in alignment with the oil line and with an opening in the wall of the crank case, means for closing the guide opening when not in use, said means comprising a valve fitted into the guide opening, said base plate being provided with an obliquely disposed guide tube in registration with said guide opening and for the purpose set forth.

In testimony whereof he affixes his signature.

CHARLES W. METZ.